Sept. 2, 1958  D. F. LUSE, JR., ET AL  2,850,615
FIRE SIMULATOR
Filed March 18, 1957
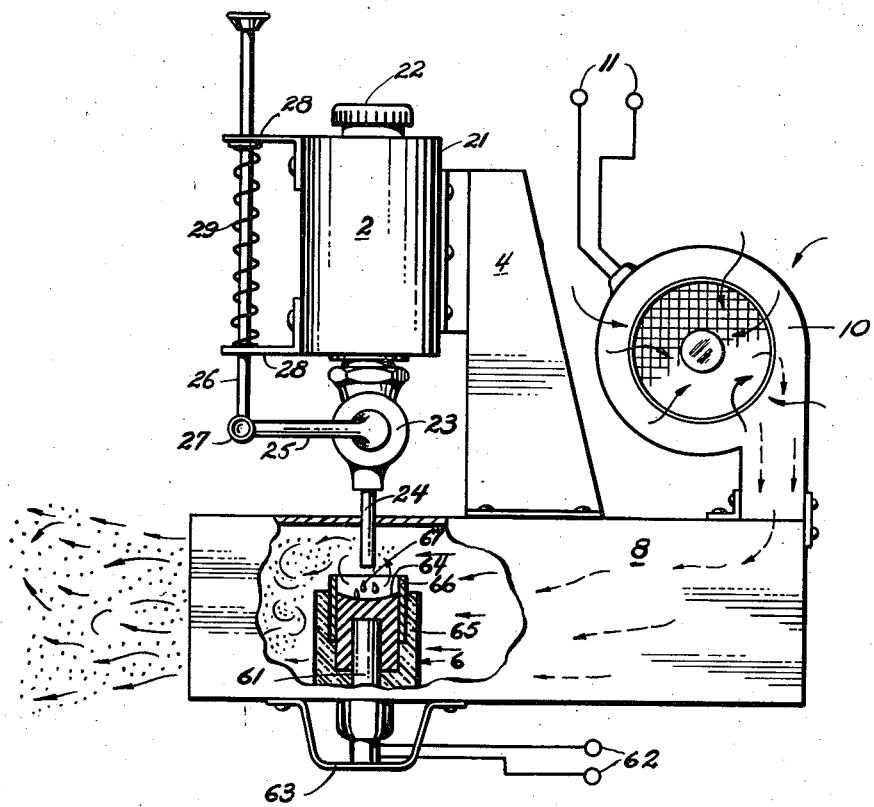
INVENTORS
DONAL F. LUSE Jr
JOHN H. MILBOURN
BY Donald P. Smith
ATTORNEY United States Patent Office 2,850,615
Patented Sept. 2, 1958

2,850,615

FIRE SIMULATOR

Donal F. Luse, Jr., Hyattsville, Md., and John H. Milbourn, Washington, D. C., assignors to ACF Industries, Incorporated, New York, N. Y., a corporation of New Jersey Application March 18, 1957, Serial No. 646,714

7 Claims. (Cl. 219—39)

This invention relates to a vapor generator and more specifically to a generator for simulating the smoke of an electrical fire.

In the field of training devices, especially aircraft, ship and other types of trainers, a student is taught by actual practice under simulated but realistic conditions the methods and procedures of handling the multitude of situations he might expect in the vehicle itself. It is a unique feature of these various trainers that failures, whether mechanical, electrical, structural, or the like, can be arbitrarily introduced by the instructor to the student requiring immediate correction or compensation by such student. One of the failures that an instructor can introduce into a problem is that of a fire, and particularly an electrical fire which will affect the performance of the equipment being simulated and require the student to take the proper corrective and compensatory action. Reference is made to application Serial No. 660,372 by John J. White and Charles L. Cohen, for an understanding of the physical arrangement of an aircraft trainer of the type in which this invention finds its preferred setting.

Prior to this invention the instructor inserted fire failures into the training device as an accomplished fact as for example by instrument failures, inoperative controls, special warning lights, oral communication from the instructor to the student. The preliminary conditions of a fire such as smoldering, smoke, smell, etc., were thus not conveyed to the student, which for true simulation and proper training are necessary information to assist the student to take the necessary compensatory and corrective steps he would ordinarily take under actual conditions.

It is an object of this invention to provide a vapor generator to be used with training devices which will correctly, accurately, and realistically simulate the initial stages of a fire.

It is an object of this invention to provide a vapor generator which is controllable by a training device instructor as to volume, texture, and periodicity of generation.

It is a further object of this invention to provide a vapor generator which is economical to construct, simple to maintain, and reliable in performance.

While there is discussed and described below one particular application of the invention it should be understood that this invention may be utilized for other well recognized purposes of generators, as for example, smoke screens, therapeutic vaporizers, etc. Further objects of this invention will be apparent from a consideration of the following disclosure, wherein the single figure is an elevation, partially cutaway view of this invention.

Considering the drawing it can be seen that this invention consists generally of a reservoir 2 containing a smoke producing fuel mounted by any suitable support such as a bracket 4 above a unit 6 which heater unit is set within a duct 8 such that the products will be contained therein and ultimately dispersed by the forced air flow produced by the impeller 10.

The reservoir 2 may be of any suitable configuration such as a cylinder 21 having a covered opening 22 in one end thereof to allow the filling such reservoir with the fuel, and a stopcock 23 at the other end of such cylinder to feed the fuel through the nozzle 24 to the unit 6. The stopcock 23 is opened and closed by the vertical action of the horizontal arm 25 which in turn is activated by the vertical movement of the pushrod 26 pivotally affixed to such horizontal arm at the pivot 27. The pushrod 26 is supported by any suitable means such as the retaining brackets 28 which are rigidly affixed to the cylinder 21 at the longitudinal extremity thereof and which retaining brackets have openings therein for slidably engaging the pushrod 26 to allow such pushrod to move vertically therein. A biasing member such as the spring 29 surrounds the pushrod 26 and the upper end of such spring is rigidly affixed to the pushrod 26 while the lower end thereof is secured to the lower retaining bracket 28 such that a restoring force will be developed by the spring whenever the pushrod is depressed.

The unit 6 shown in section in the cutaway portion of the duct 8 consists of an electrical heater element 61 energized from source indicated generally at 62. The heater element 61 is mounted beneath the duct 8 and is supported by the member 63 which is rigidly affixed to such duct 8 by any suitable means such as rivets and the like. The heater element 61 is surrounded by the platen 64 which is of any heat conducting material such as iron, steel and the like. Any suitable insulation 65 such as asbestos or the like completely circumscribes the platen 64 and the heater element 61 in order to retain the heat within the unit 6 and for the purpose of safety. The splash ring 66 disposed between the insulation 65 and the platen 64 projects above and completely circumscribes the platen 64 such that the surface of the platen becomes the bottom of a basin type configuration in order that the fuel shown as droplets 67 falling from the nozzle 24 will not jump from the surface of the hot platen 64 and fall on the inner surface of the duct 8.

A glyceric substance such as glycerine itself is recommended for use in this invention since it has been found to be the best suited for producing the effects of an electrical fire. It should be appreciated that any of the well recognized smoke producing substances such as oil, etc. may be used with this invention. It is necessary when using a glyceric substance that the temperature of the unit 6 be maintained above the boiling point (approximately 554° F.) and below the ignition temperature (739° F.) of such glyceric substance, to insure the generation of simulated smoke. The acceptable temperature range, then, is 554° F.–739° F. The use of a glyceric substance is recommended for the particular application of simulating an electrical fire because the vapor products thereof are very similar to the smoke produced when electrical insulation burns. Similarly the smell of the glyceric vapor is identifiable with the smell of burning electrical insulation. Further, a glyceric substance is recommended because when it is vaporized the products thereof are non-toxic and little if any residue remains.

The impeller 10 is of the forced fan type energized from an electrical source shown generally at 11. The impeller 10 takes in air from the atmosphere as indicated by the solid arrows and forces it into the duct 8 across the unit 6 where it drives the products indicated by the turbulating dots out of the duct into the vicinity of the student.

The operation of this invention starts when the instructor actuates the pushrod 26 which opens the stopcock 23 allowing the glyceric substance to drop upon the preheated platen 64 where it is vaporized. The forced air of the impeller 10 carries the resulting vapor to the student. The quantity, quality and periodicity of generation of the vapor is within the sole control of the instructor in that he may allow one drop or a steady stream of the glyceric substance to fall on the platen by periodic or steady depression of the pushrod 26. Upon release, the spring 29 forces the pushrod 26 in an upward direction thereby closing the stopcock 23 and terminating the flow of the glyceric substance.

While there is shown and described one particular embodiment of the invention it should be understood that various changes in the size, shape and arrangement of parts may be resorted to without departing from the spirit or scope of the invention wherein, what is claimed is:

1. In a vapor producing apparatus for use in simulating a fire in an aircraft the combination comprising a fuel supply hopper having a longitudinal axis of symmetry, heating means fixed below said hopper and aligned with said axis, control means on said hopper to regulate the supply of fuel to said heating means and a fan structure arranged to drive the vapor from the heating means and into the presence of an individual being trained.

2. The invention as set forth in claim 1 wherein the said control means comprises a normally closed valve, and a duct structure surrounding the said fan and the said heating means to convey the vapor to the individual.

3. In an aircraft trainer having an area to house a student during training cycles a system to simulate a fire in the aircraft comprising in combination a supply hopper for a heat-vaporable fuel, a conduit disposed below said hopper and communicating between a source of air under elevated pressure and the training area, heating means fixed in said conduit below said hopper, and control means to supply the fuel to said heating means whereby to convey the vapor produced into the training area to realistically reproduce the conditions of a fire to the student.

4. In an aircraft trainer having an area for housing a student during training cycles a system to simulate a fire in the aircraft comprising in combination a supply hopper, a quantity of heat vaporable fuel in said hopper, a conduit fixed below said hopper, a source of air under pressure higher than ambient connected to one end of said conduit, the other end thereof terminating in the student's training area, heating means fixed in said conduit below said hopper, and control means extending between the said hopper and the said heating means to supply fuel at a predetermined rate to said heating means whereby the vapor produced is conveyed into the student's area to reproduce the conditions of a fire.

5. In an aircraft trainer having an area for housing a student during a training cycle a system to simulate a fire in the aircraft comprising in combination a duct intercommunicating between a source of air under elevated pressure and the student's area, an electrical heater assembly mounted in said duct and operable to continuously vaporize a glyceric fluid fed thereto from a supply source, a fluid supply system for the heater assembly including a control device to regulate the supply of fluid whereby the generated vapor is conveyed to the student's area to reproduce the conditions of a fire.

6. A simulated smoke generator of the type described comprising an enclosed chamber, a reservoir mounted on said chamber, a glyceric substance stored in said reservoir, periodic transfer means attached to said reservoir and projecting within said chamber, a platen mounted within said chamber beneath said transfer means to receive and heat said substance, a heat source adjacent said platen to maintain the temperature of said platen between about 554° F.–739° F., and an impeller affixed to said chamber to disperse the products in said chamber.

7. In an aircraft trainer having a cockpit to house a student during a training cycle a system to simulate a fire in the aircraft comprising in combination a duct opening into the cockpit in the vicinity of the student, a blower assembly connected to the other end of said duct, an electrical heater assembly mounted in said duct including means to maintain a portion thereof at such a temperature as to convert a glyceric fluid to the vapor phase, a fluid supply system for the heater assembly and a valve in said system operable by a training instructor to control the flow of fluid to said heater to thereby reproduce the conditions of a fire to the student.

References Cited in the file of this patent

UNITED STATES PATENTS

| | | |
|---|---|---|
| 2,048,997 | Collins | July 28, 1936 |
| 2,070,038 | Batt | Feb. 9, 1937 |
| 2,408,429 | Levey | Oct. 1, 1946 |
| 2,428,580 | Pennow | Oct. 7, 1947 |